(12) United States Patent
Zheng et al.

(10) Patent No.: US 7,849,076 B2
(45) Date of Patent: Dec. 7, 2010

(54) LEARNING RANKING FUNCTIONS INCORPORATING ISOTONIC REGRESSION FOR INFORMATION RETRIEVAL AND RANKING

(75) Inventors: Zhaohui Zheng, Sunnyvale, CA (US); Hongyuan Zha, Norcross, GA (US); Gordon Sun, Redwood Shores, CA (US)

(73) Assignee: Yahoo! Inc., Sunnyvale, CA (US)

( * ) Notice: Subject to any disclaimer, the term of this patent is extended or adjusted under 35 U.S.C. 154(b) by 465 days.

(21) Appl. No.: 12/060,195

(22) Filed: Mar. 31, 2008

(65) Prior Publication Data
US 2009/0248668 A1    Oct. 1, 2009

(51) Int. Cl.
G06F 17/30    (2006.01)
G06F 7/00    (2006.01)

(52) U.S. Cl. ............... 707/715; 707/735; 707/748

(58) Field of Classification Search ............ 707/715
See application file for complete search history.

(56) References Cited

U.S. PATENT DOCUMENTS 7,472,096 B2 *   12/2008   Burges et al. ............... 706/20
7,647,314 B2 *   1/2010    Sun et al. ............... 706/12
7,739,264 B2 *   6/2010    Jones et al. ............... 707/713
2005/0289102 A1 *   12/2005   Das et al. ............... 707/1

* cited by examiner

*Primary Examiner*—Kuen S Lu
*Assistant Examiner*—Binh V Ho
(74) *Attorney, Agent, or Firm*—Seth H. Ostrow; Ostrow Kaufman LLP

(57) ABSTRACT

Embodiments of the present invention provide for methods, systems and computer program products for learning ranking functions to determine the ranking of one or more content items that are responsive to a query. The present invention includes generating one or more training sets comprising one or more content item-query pairs and determining one or more contradicting pairs in a given training sets. An optimization function to minimize the number of contradicting pairs in the training set is formulated, and modified by incorporating a grade difference between one or more content items corresponding to the query in the training set and applied to each query in the training set. A ranking function is determined based on the application of regression trees on the queries of the training set minimized by the optimization function and stored for application to content item-query pairs not contained in the one or more training sets.

30 Claims, 3 Drawing Sheets

LEARNING RANKING FUNCTIONS INCORPORATING ISOTONIC REGRESSION FOR INFORMATION RETRIEVAL AND RANKING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments of the invention disclosed herein relate generally to information retrieval and ranking. More specifically, the present invention relates systems, methods and computer program products for the learning of ranking functions that incorporate isotonic regression to determine the ranking of one or more content items that are responsive to a query.

BACKGROUND OF THE INVENTION

Search engines are essential tools for retrieving and exploring extraordinary large collections of information sources available on the World Wide Web. As the World Wide Web has grown, the ability of users to search this collection of information and identify content relevant to a particular subject has become increasingly important. To a large extent, users determine the quality of a search engine by the ranking function that a given search engine uses to produce search results responsive to a given search query. Thus, to be useful, a search engine should determine those content items in a given result set that are most relevant to the user on the basis of the query that the user submits and rank such content items accordingly.

A determination as to those content items that are relevant to the query is influenced by a number of factors, many of which are highly subjective. Due to the highly subjective nature of such factors, it is generally difficult to capture in an algorithmic set of rules factors that define a function for ranking content items. Furthermore, these subjective factors may change over time, as for example when current events are associated with a particular query term. Thus, users who receive search result sets that contain results the user does not perceive to be highly relevant become frustrated and potentially abandon the use of a search engine. Therefore, designing an effective and efficient function that retrieves and efficiently ranks content items is of the upmost importance to the field of information retrieval.

Research and experiments in information retrieval in the past have produced many fundamental methodologies and algorithms in an attempt to solve this problem, including vector space models, probabilistic models and language modeling-based methodologies. Recently, machine learning methods have become an important tool in the retrieval and ranking of content items responsive to a search query. Such machine learning methods, however, have certain limitations. In particular, existing machine learning methods for learning ranking functions fail to take account of all preference data within a query to allow for faster convergence. Therefore, there exists a need for an improved machine learning method for learning ranking functions that is directed to a more global approach to solving issues of relevance in the retrieval of content items in response to a query.

SUMMARY OF THE INVENTION

Generally, the present invention provides for methods, systems and computer program products for learning ranking functions to determine the ranking of one or more content items that are responsive to a query. The present invention includes generating one or more training sets comprising one or more content item-query pairs and determining one or more contradicting pairs in a given training sets. An optimization function to minimize the number of contradicting pairs in the training set is formulated. The optimization function is modified by incorporating a grade difference between one or more content items corresponding to the query in the training set and applied to each query in the training set. A ranking function is determined based on the application of regression trees on the one or more queries of the training set minimized by the optimization function and stored for application to content item-query pairs not contained in the one or more training sets.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
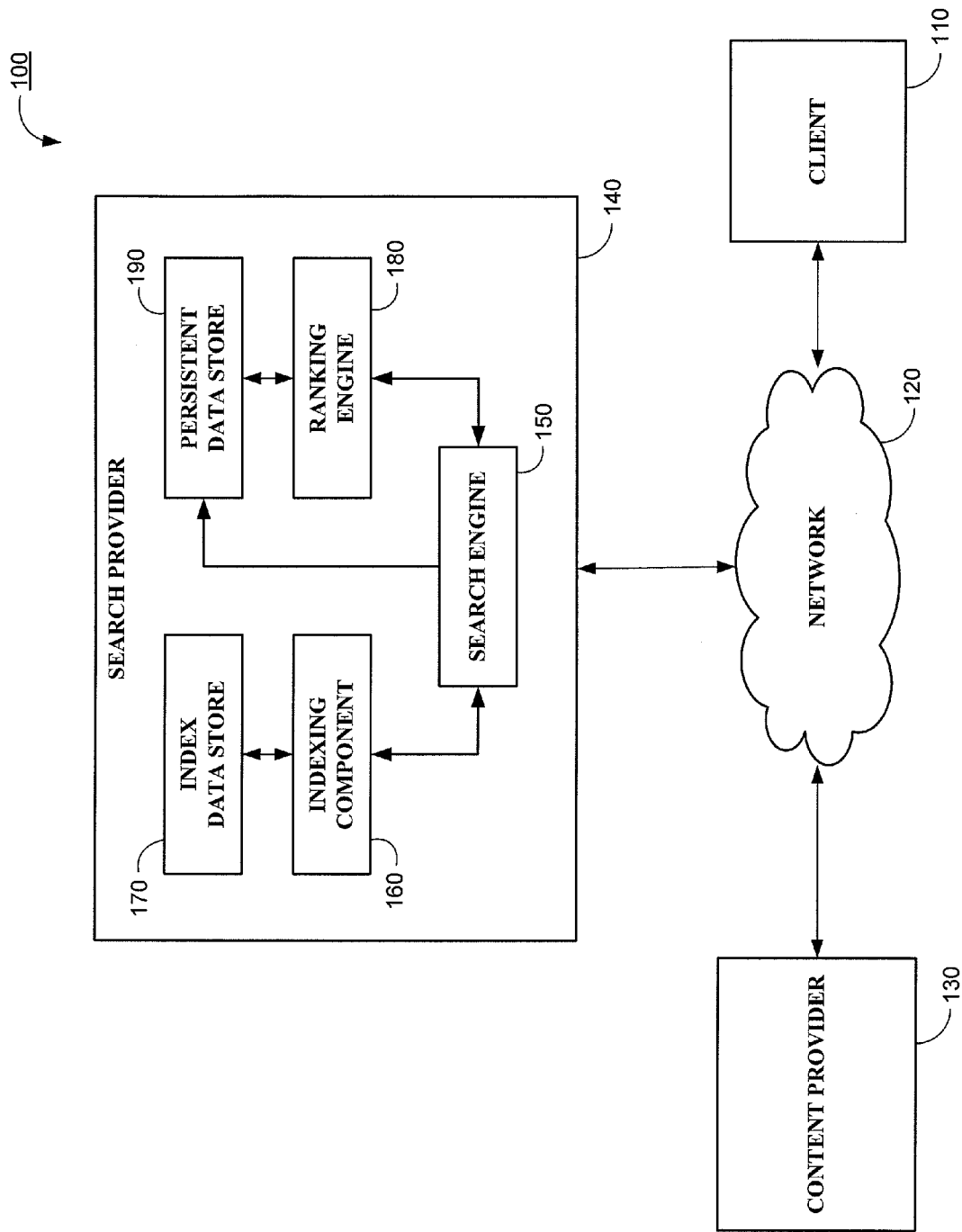
FIG. 1 illustrates a block diagram of a system for learning ranking functions that incorporate isotonic regression to determine the ranking of one or more content items that are responsive to a query according to one embodiment of the present invention.

FIG. 1 illustrates one embodiment of a system for determining learning ranking functions that isotonic regression to determine the ranking of one or more content items that are responsive to a query 100. System 100 includes one or more clients 110, a computer network 120, one or more content providers 130, and a search provider 140. The search provider 140 comprises a search engine 150, an indexing component 160, an index data store 170, a ranking engine 180 and a persistent data store 190.

The computer network 120 may be any type of computerized network capable of transferring data, such as the Internet. According to one embodiment of the invention, a given client device 110 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc. The present invention is not limited to only a single client device 110 and may comprise additional, disparate client devices. The client device 110 is therefore presented for illustrative purposes representative of multiple client devices.

According to one embodiment of the invention, a given content provider 130 and the search provider 140 are programmable processor-based computer devices that include persistent and transient memory, as well as one or more network connection ports and associated hardware for transmitting and receiving data on the network 120. The content provider 130 and the search provider 140 may host websites, store data, serve ads, etc. The present invention is not limited to only a single content provider 130 and may comprise additional, disparate content providers. The content provider 130 is therefore presented for illustrative purposes representative of multiple content providers. Those of skill in the art understand that any number and type of content provider 130, search provider 140 and client device 110 may be connected to the network 120.

The search engine 150, the indexing component 160 and the ranking engine 180 may comprise one or more processing elements operative to perform processing operations in response to executable instructions, collectively as a single element or as various processing modules, which may be physically or logically disparate elements. The index data store 170 and the persistent data store 190 may be one or more data storage devices of any suitable type operative to store corresponding data therein. Those of skill in the art recognize that the search provider 140 may utilize more or fewer components and data stores, which may be local or remote with regard to a given component or data store.

In accordance with one embodiment, the client device 110, the search provider 140 and the content provider 130 are communicatively coupled to the computer network 120. Using the network 120, the search provider 140 is capable of accessing the content provider 130, which hosts content items a user may wish to locate through use of the search engine 150 at the search provider 140. The search provider 140 may communicate with the content provider 130 for maintaining cached copies of content items that the content provider 130 hosts at the persistent data store. The collection of content items, as well as information regarding content items, is referred to as "crawling," and is the process by which the search provider 140 collects information upon which the search engine 150 performs searches.

The search provider 140 crawls one or more content providers 130 that are in communication with the network 120, which may comprise collecting combinations of content items and information regarding the same. An index component 160 parses and indexes the content items and related information that the search provider 150 collects through the crawling process. The index component 160 generates an index that provides a structure for the content items and related information, allowing for the location and retrieval of the content items and related information. According to one embodiment of the invention, the index component 160 creates an index of word-location pairs that allows the search engine 150 to identify specific content items and information regarding the same in response to a query, which may be from a user, software component, automated process, etc. The one or more indexes that the indexing component 160 generates are written to an index data store 170 for persistent storage and use by other components of the search provider 140.

A user of a given client device 110 desires to retrieve a content item from a content provider 130 that is relevant to a particular topic, but who is unsure or ignorant regarding the address or location of the content item, submits a query to the search engine 150. According to one embodiment, a user utilizes a given client device 110 to connect over the network 120 to the search engine 150 at the search provider 140 and provide a query. A typical query has one or more terms. For example, the query "New York Yankees" contains three terms and is referred to as a three-term query. Similarly, queries containing only one term are referred to as one-term queries, queries containing two terms are two-term queries, etc. A space or other delimiter character that the search engine 150 recognizes as such may delimit individual terms comprising a query.

Upon receipt of the query, the search engine 150 may examine the index using the terms comprising the query in an attempt to identify a result set that contains those content items that are responsive to the query. The search engine 150 formulates the result set for transmission over the network 120 and for presentation to the user through use of the client device 110. Where the result set comprises link to content items, the user may select a link in the result set to navigate to the content provider 130 that is hosting the content item that the link identifies. The search engine 150 utilizes a persistent data store 190 for storage of an historical log of the queries that users submit, which may include an indication of the selection of items in results sets that the search engine 150 transmits to users.

As discussed previously, users become increasingly frustrated when presented with a result set that does not identify content items that are more relevant to a given query prior to less relevant items. Accordingly, the present embodiment provides a ranking engine 180 that is operative to utilize machine learning to determine the relevance of a given content item to a given query. The ranking engine 180 receives pairs of queries and content items, applying a ranking function to determine the ranking of the content item responsive to the query. Systems, methods and computer program products for the selection of a ranking function is described in greater detail herein.

The ranking engine 180 utilizes a feature vector of a given query-content item pair in determining the appropriate ranking. A feature vector is developed by extracting a set of features from a given query-content item pair, where a given feature is a quantification of an aspect of a relationship between a query and content item, which may include quantifying aspects of the query, the content item, or both. According to one embodiment, the components of a feature vector can be grouped into three categories: (1) query features that are dependent on the query only and have constant values across documents in the document set, for example, the number of terms in the query or whether or not the query is a navigational query, (2) document features that are dependent on the document and have constant values across all the queries in the query set, for example the number of inbound links pointing to the document or the spam score for the document and (3) query features that are dependent on the relation of the query with respect to the document, for example, the number of times a given term in the query appears in the document.

A training set forms the input for determining a ranking function that the ranking engine 180 utilizes to rank content items responsive to a given query. The ranking engine 180 receives a training query and a set of content items for inclusion in a primary training set, which the ranking engine 180 may select. According to one embodiment, the ranking engine 180 presents content items from the training set to one or more human subjects for the assignment of a label indicating the relevance of content items in the training set to the query. For example, a label may be assigned to each query-document pair based on the degree of relevance from the ordinal set Perfect, Excellent, Good, Fair or Bad, with a Bad rating being least relevant and a Perfect rating being most relevant. Alternatively, the ranking engine 180 may access the persistent data store 190 to retrieve a past query (training query) and corresponding result set (primary training set), utilizing selection information from a user regarding the selection of items in the result set in response to the query to determine labels for the content items in the primary training set to the query.

The ranking engine 180 may then develop one or more training subsets utilizing the label data and the feature vectors. For example, the ranking engine 180 may randomly divide the primary training set into five training sets. The training subsets then used to generate a set of preference data based upon the feature vectors for each query document pair and the corresponding label data. For example, a given training subset may contain a given query q and two corresponding documents, $d_x$ and $d_y$. The feature vectors for the query document pairs (q, $d_x$) and (q, $d_y$) may be termed x and y, respectively. If $d_x$ is more relevant to the query q than $d_y$, e.g., $d_x$ has higher numerical label than $d_y$ for the query q, the ranking engine 180 establishes the preference x>y. The ranking engine 180 may consider one or more pairs of documents within the search results for each a given in the respective training subsets. On the basis of the label data and the preference data, the ranking engine 180 is operative to identify or otherwise derive a ranking function, which the ranking engine 180 applies to determine the ranking of content items to a new query that the search engine 150 receives.

According to one embodiment, the ranking function that the ranking engine 180 applies utilizes a functional iterative method wherein the update at a given iteration may be computed by solving an isotonic regression problem to minimize a loss function. A loss function according to one embodiment of the invention comprises a total number of contradicting pairs on a training set. Utilizing a functional iterative method to solve an isotonic regression problem allows for the accounting of the preference data within a search query. By providing such a global approach, the ranking faction provides faster convergence and improved performance by updating the iterates using the preference data set within each query, which may comprise the entire preference data set within each query. Accordingly, when the ranking engine 180 applies the learned ranking function, the ranking engine 180 may determine the ranking of content items related to a query that the search engine 150 is processing.

When the search engine 150 receives a query from a client device 110 that the user is utilizing, the search engine 150 queries the index in the index data store 170 to determine a result set that is responsive to the query. The search engine 108 may also pass the query and result set to the ranking engine 180. The ranking engine 180 applies the trained ranking function to the one or more content items that it receives from the search engine 150, determining the ranking for the content items in the result set. According to one embodiment, the ranking engine 180 may use the ranking function to develop a ranking score for one or more content items. The search engine 150 receives the ranking scores for the content items in the result set from the ranking engine 180 and may utilize the scores for ranking or ordering purposes, e.g., presenting the content items or links to content items with the highest ranking scores (more relevant) prior to the content items or links to content items in the result set with lesser ranking scores (less relevant). The search engine 150 transmits the ranked result set to the client device 110 for viewing by the user.

Figure 2:
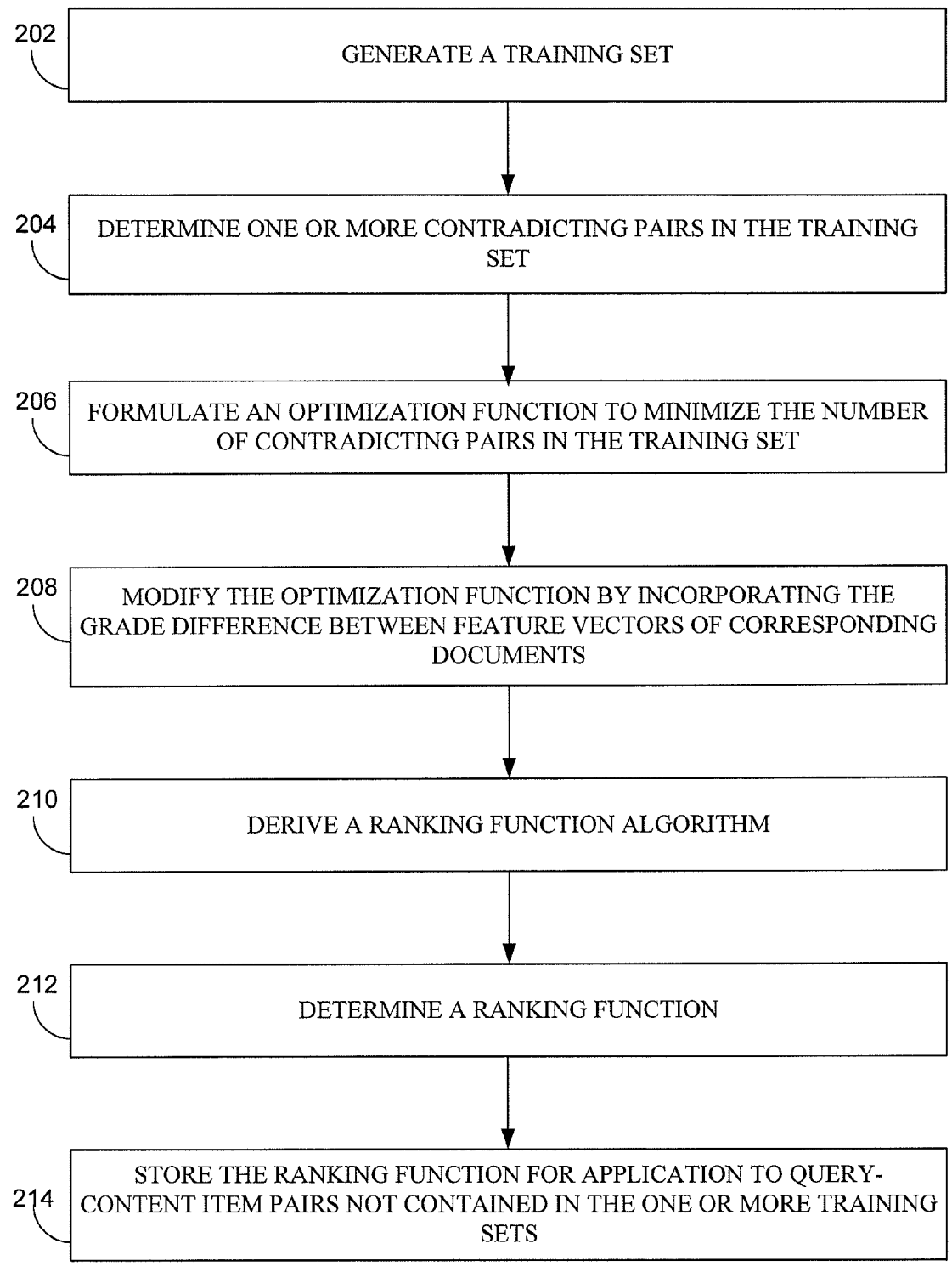
FIG. 2 illustrates a flow diagram presenting a method for learning ranking functions that incorporate isotonic regression to determine the ranking of one or more content items that are responsive to a query according to one embodiment of the present invention.

FIG. 2 illustrates one embodiment a method for learning ranking functions that incorporate isotonic regression to determine the ranking of one or more content items that are responsive to a query according to one embodiment of the present invention. To understand the ranking function that is developed to determine the ranking of one or more content items that are responsive to a query, it is useful to formulate the learning problem under consideration. As discussed previously with regard to FIG. 1, a given query-document pair may be represented by a feature vector, generically denoted by x. To learn pairwise preference data, the relevance assessment in the training data may be in the form of one document is more relevant than another document with respect to a given query.

According to the present embodiment, a training set is to determined, step 202, which may begin by setting $S_q$ as representing the subset of the an index set $P_n$ of documents, where:

$$\mathcal{P}_n = \{(i,j), i,j=1, \ldots, n\}.$$

As a query q may have several associated documents $d_1, \ldots, d_n$, the relevance assessment requires that $d_i$ is more relevant than $d_j$ for $(i,j) \in S_q$. Therefore, feature vector $x_i$ may be ranked higher than feature vector $x_j$. A training set may then be developed for other query-document pairs, so that the feature vectors represent the training data of the query-document pairs and include the set of queries, their associated documents and pairwise preferences among them, which may be denoted as $$\mathcal{T} = \{(I_i, I_j) | I_i > I_j, (i,j) \in S\}. \qquad \text{Equation 1}$$

According to the relevance assessment, for a given query q that may have several associated documents $d_1, \ldots, d_n$, the relevance assessment requires that $d_i$ is more relevant than $d_j$, so that for a ranking function h, $h(x_i) \geq h(x_j)$. To empirically measure the performance of the ranking function h with respect to a training set $\mathcal{T}$, however, contradicting pairs are determined, step 204. A pair $<x_i, x_j>$ with $x_i > x_j$ is a contradicting pair for the ranking function h if $h(x_i) < h(x_j)$, e.g., the ranking function h reverses the order of the given pair. To learn a ranking function for the ranking of one or more content items that are responsive to a query, embodiments of the present invention seek to minimize the number of contradicting pairs, step 206, which may be accomplished by the following optimization equation:

$$\min_{h \in \mathcal{H}} \mathcal{R}_\mathcal{T}(h) = \min_{h \in \mathcal{H}} \sum_{(x_i, x_j) \in \mathcal{T}} 1(h(x_i) < h(x_j)), \qquad \text{Equation 2}$$

where $\mathcal{H}$ is a given function class and $1(h(x_i) < h(x_j))$ is an indicator function such that the indicator function equals 1 if the argument is true and otherwise equals 0. To minimize $\mathcal{R}_\mathcal{T}(h)$, an iterative algorithm may be used for its approximate solution. The given function class $\mathcal{H}$ is assumed closed under summation and an initial value, $h_D(I) \in \mathcal{H}$, is set. At a given step m, an update, $g_m(I) \in \mathcal{H}$, may be computed to obtain the next iterate, which may be represented as $$h_{m+1} = h_m(I) + g_m(I). \qquad \text{Equation 3}$$

To compute $g_m(x)$, a determination may be made as to which pairs in the training set $\mathcal{T}$ are consistent so that $h_m(x_i) \geq h_m(x_j)$, $(i,j) \in S$, leaving the remaining pairs as contradicting. The ranking function may be modified such that the ranking function $h(x_i)$ becomes $h(x_i)+\delta_i$, $i=1, \ldots, N$ so that the new set of values $h(x_i)+\delta_i$ are consistent with $\mathcal{T}$, i.e. $h(x_i)+\delta_i \geq h(x_j)+\delta_j$, $(i,j) \in S$. A determination is the made for $g_m(x) \in \mathcal{H}$, so that $g_m(x_i) \approx \delta_i$, $i=1, \ldots, N$. Therefore, the optimization problem becomes $$\min_{\delta_i} \sum_{i=1}^{n} \delta_i^2$$

subject to constraints $$h_m(I_i)+\delta_i \geq h_m(I_j)+\delta_j (i,j) \in S_q. \quad \text{Equation 4}$$

Equation 4 represents a quadratic programming problem referred to as isotonic regression, which is applied to each query in the training set $\mathcal{T}$. According to embodiments of the present invention, Equation 4 has the following constraints when the subset $S_q$ is equal to the index set $P_n$, $$h_m(I_1)+\delta_1 \geq h_m(I_2)+\delta_2 \geq \ldots \geq h_m(I_n)+\delta_n,$$

The isotonic regression function may be solved with computational complexity using the Pool-Adjacent-Violator ("PAV") Algorithm, which is known to those of skill in the art.

As the previous discussion illustrates, the training set is developed in part using label data where, for example, a label may be assigned to a given query-document pair on the basis of a degree of relevance from the ordinal set Perfect, Excellent, Good, Fair or Bad, with a Bad rating being least relevant and a Perfect rating being most relevant. According to one embodiment, the ordinal set of labels may be mapped to grades $\{5, 4, 3, 2, 1\}$, respectively. Therefore, in a training set with a query q and two corresponding documents, $d_x$ and $d_y$, which may form the basis to create feature vectors that may be termed x and y, respectively, a grade difference may be determined between x and y. In step 208, the grade difference may be used as margin to enhance the constraints in Equation 4, thus modifying the optimization problem as, $$\min_{\delta_i} \sum_{i=1}^{n} \delta_i^2 + \lambda n \zeta^2$$

subject to constraints $$h(I_i)+\delta_i \geq h(I_j)+\delta_j+\Delta G_{ij}(1-\zeta), (i,j) \in S_q.$$

$$\zeta \geq 0. \quad \text{Equation 5}$$

where $\Delta G_{ij}$ is the margin set to the grade difference between $x_i$ and $x_j$, $\zeta$ is a slack variable allowing for the softening of the constraints imposed by $G_{ij}$, and $\lambda$ is regularization parameter balancing the properties of Equation 2.

Utilizing the modified optimization problem that Equation 4 illustrates, a ranking function algorithm may be derived, step 210, which may be expressed as follows:

---
Algorithm 1 $I_{SO}$RANK
---
Input: A set of pairwise preference data $\mathcal{T}$ in (1).
Output: A ranking function $h_{max}(x)$.
Start with an initial guess $h_o$, for m = 1,2, ..., $m_{max}$,
   1. Compute $\delta_i$, i = 1, ..., N by solving the isotonic regression problem (4).
   2. Fit a regression tree $g_m(x)$ so that $g_m(x_i) \approx \delta_i$.
   3. Update $h_{m+1} = h_m(x) + \eta g_m(x)$.
---

As demonstrated in Algorithm 1, a ranking function algorithm is derived by iteratively fitting regression trees on the entire training set $\mathcal{T}$, as is known in the art, once the minimization is performed by the optimization function identified in Equation 4 on each query in the training set $\mathcal{T}$.

The output of the ranking function algorithm is the ranking function $h_{max}(x)$, step 212, which the algorithm updates $h_{m+1}=h_m+\eta g_m(x)$, where $\eta$ is a shrinkage factor that controls the step size along the direction $g_m(x)$ in the iterative step and may be set between 0.05 and 0.1. Upon determining the ranking function, the ranking engine stores the ranking function for use in determining the ranking of query-content item pairs not contained in the training set, step 214, e.g., unclassified query-content item pairs.

Figure 3:
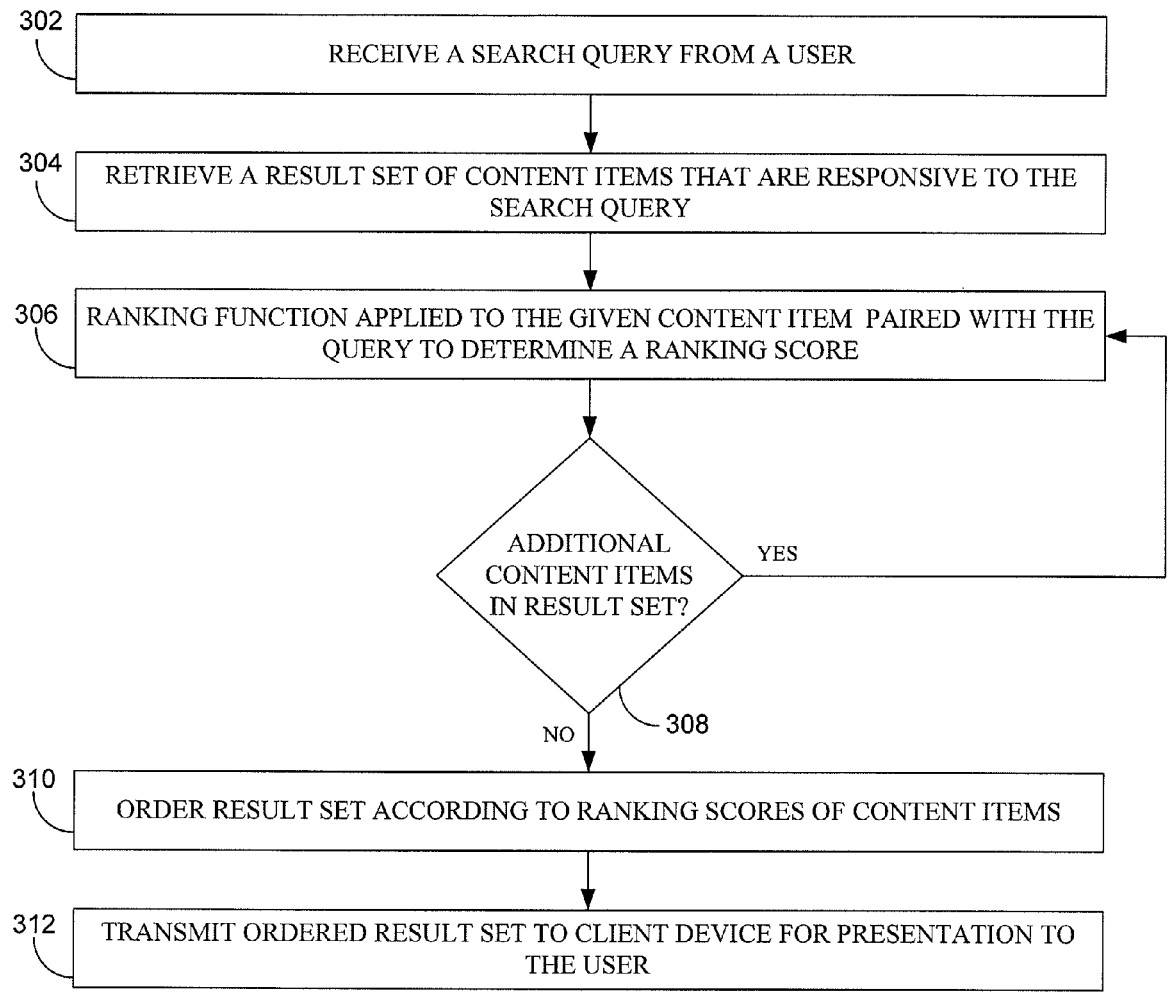
FIG. 3 presents one embodiment of a method for using the ranking function to order a result set that the search engine deems responsive to a given query according to one embodiment of the present invention.

FIG. 3 presents one embodiment of a method for using the ranking function to order a result set that the search engine deems responsive to a given query. A user submits a query to the search engine, step 302, which causes the search engine to retrieve a set of content items for ranking in accordance with to the relevance of the content items to the query, step 304. In one embodiment, only content including or associated with one or more terms in the query are included in the result set, for example, content items that contain user supplied tags that contain the terms. In another embodiment, the search engine may utilize other criteria to select content for inclusion in the result set.

According to one embodiment, the trained ranking function is used to determine a ranking score for a given content item as paired with the query, step 306. The ranking function receives a feature vector as well as labeled data for a given content item as input and provides a ranking score. A check is performed to determine if additional content items exist to which the ranking function is to be applied, step 308. Processing continues until a ranking score has been calculated for each of the content items in the result set, step 306. The search engine orders the result set according to the ranking score associated with the content item in the result set, step 310. The search engine transmits the ordered result set to the client device for presentation to the user, step 312.

In accordance with the foregoing description, the present invention provides for systems, methods and computer program products for learning ranking functions that incorporate isotonic regression to determine the ranking of one or more content items that are responsive to a query. In learning ranking functions that incorporate isotonic regression to determine the ranking of one or more content items that are responsive to a query, the present invention allows for an effective and efficient function which retrieves and efficiently ranks content items.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for learning ranking functions to determine the ranking of one or more content items that are responsive to a query, the method comprising:
    generating one or more training sets comprising one or more content item-query pairs;
    determining one or more contradicting pairs in a given training set;
    formulating an optimization function to minimize the number of contradicting pairs in the training set using a functional iterative method that comprises applying an isotonic regression function within each query and using the output to determine regression targets for each content item-query pair in a next iteration;
    modifying the optimization function by incorporating a grade difference between one or more content items corresponding to the query in the training set;
    applying the optimization function to each query in the training set;
    determining a ranking function based on an application of regression trees on the one or more queries of the training set minimized by the optimization function; and
    storing the ranking function for application to content item-query pairs not contained in the one or more training sets.

2. The method of claim 1, further comprising utilizing one or more regularization parameters to control parameters of the ranking function.

3. The method of claim 1, wherein generating one or more training sets comprising one or more content item-query pairs further comprises extracting query dependent features for the one or more content item-query pairs.

4. The method of claim 1, wherein generating one or more training sets comprising one or more content item-query pairs further comprises extracting query independent features for the one or more content item-query pairs.

5. The method of claim 1, wherein generating one or more training sets comprising one or more content item-query pairs further comprises providing a given query-content item pair to a human subject to determine a relevance label.

6. The method of claim 1, wherein generating one or more training sets comprising one or more content item-query pairs further comprises determining a relevance label based on historical click through data for a given content item-query pair.

7. The method of claim 1, further comprising applying the ranking function to a new content item in response to receipt of a query from a user.

8. The method of claim 7, wherein applying the ranking function to a new content item in response to receipt of a query from a user, further comprises:
    retrieving one or more content items in a result set in response to receipt of the query from the user;
    determining a feature vector for a given content item in the result set;
    applying the ranking function to the feature vector for the given content item; and
    generating a ranking score for the given content item.

9. The method claim 8, further comprising ordering the given item in the result set according to the ranking score for the given content item.

10. The method of claim 5, further comprising transmitting the result set to the user.

11. Computer readable media comprising program code that when executed by a programmable processor causes execution of a method for learning ranking functions to determine the ranking of one or more content items that are responsive to a query, the computer readable media comprising:
program code for generating one or more training sets comprising one or more content item-query pairs;
program code for determining one or more contradicting pairs in a given training set;
program code for formulating an optimization function to minimize the number of contradicting pairs in the training set using a functional iterative method that comprises applying an isotonic regression function within each query and using the output to determine regression targets for each content item-query pair in a next iteration;
program code for modifying the optimization function by incorporating a grade difference between one or more content items corresponding to the query in the training set;
program code for applying the optimization function to each query in the training set;
program code for determining a ranking function based on an application of regression trees on the one or more queries of the training set minimized by the optimization function; and
program code for storing the ranking function for application to content item-query pairs not contained in the one or more training sets.

12. The computer readable media of claim 11, further comprising program code for utilizing one or more regularization parameters to control parameters of the ranking function.

13. The computer readable media of claim 11, wherein program code for generating one or more training sets comprising one or more content item-query pairs further comprises program code for extracting query dependent features for the one or more content item-query pairs.

14. The computer readable media of claim 11, wherein program code for generating one or more training sets comprising one or more content item-query pairs further comprises program code for extracting query independent features for the one or more content item-query pairs.

15. The computer readable media of claim 11, wherein program code for generating one or more training sets comprising one or more content item-query pairs further comprises program code for providing a given query-content item pair to a human subject to determine a relevance label.

16. The computer readable media of claim 11, wherein program code for generating one or more training sets comprising one or more content item-query pairs further comprises program code for determining a relevance label based on historical click through data for a given content item-query pair.

17. The computer readable media of claim 11, further comprising program code for applying the ranking function to a new content item in response to receipt of a query from a user.

18. The computer readable media of claim 17, wherein program code for applying the ranking function to a new content item in response to receipt of a query from a user, further comprises:
program code for retrieving one or more content items in a result set in response to receipt of the query from the user;
program code for determining a feature vector for a given content item in the result set;
program code for applying the ranking function to the feature vector for the given content item; and
program code for generating a ranking score for the given content item.

19. The computer readable media of claim 18, further comprising program code for ordering the given item in the result set according to the ranking score for the given content item.

20. The computer readable media of claim 19, further comprising program code for transmitting the result set to the user.

21. A system for learning ranking functions to determine the ranking of one or more content items that are responsive to a query, the system comprising:
a computer network;
a search engine operative to receive a search query comprising one or more terms from a user and to locate and retrieve one or more content items and related information responsive to the search query;
an indexing component operative to parse the search query into one or more constituent terms and generate an index that defines a structure for the content items and related information that allows for location and retrieval of the content items and related information;
an index data store operative to store the one or more indexes generated by the indexing component;
a persistent data store operative to store a historical log of queries that users submit; and
a ranking engine operative to, generate one or more training sets comprising one or more content item-query pairs;
determine one or more contradicting pairs in a given training sets;
formulate an optimization function to minimize the number of contradicting pairs in the training set using a functional iterative method that comprises applying an isotonic regression function within each query and using the output to determine regression targets for each content item-query pair in a next iteration;
modify the optimization function by incorporating a grade difference between one or more content items corresponding to the query in the training set;
apply the optimization function to each query in the training set;
determine a ranking function based on the an application of regression trees on the one or more queries of the training set minimized by the optimization function; and
store the ranking function for application to content item-query pairs not contained in the one or more training sets.

22. The system of claim 21, wherein the ranking engine is operative to utilize one or more regularization parameters to control parameters of the ranking function.

23. The system of claim 21, wherein the ranking engine is operative to extract query dependent features for the one or more content item-query pairs.

24. The system of claim 21, wherein the ranking engine is operative to extract query independent features for the one or more content item-query pairs.

25. The system of claim 21, wherein the ranking engine is operative to provide a given query-content item pair to a human subject to determine a relevance label.

26. The system of claim 21, wherein the ranking engine is operative to determine a relevance label based on a historical log of click through data for a given content item-query pair.

27. The system of claim 21, wherein the ranking engine is operative to apply the ranking function to a new content item in response to receipt of a query from a user.

28. The system of claim 27, wherein
the search engine is operative to retrieve one or more content items in a result set in response to receipt of the query from the user; and
the ranking engine is operative to
determine a feature vector for a given content item in the result set,
apply the ranking function to the feature vector for the given content item, and
generate a ranking score for the given content item.

29. The system of claim 28, wherein the search engine is operative to order the given item in the result set according to the ranking score for the given content item.

30. The system of claim 29, wherein the search engine is operative to transmit the result set to the user.

* * * * *